US010591363B2

(12) United States Patent
Phillips et al.

(10) Patent No.: US 10,591,363 B2
(45) Date of Patent: Mar. 17, 2020

(54) ACCURATE AND FAST RESPONSE TEMPERATURE MEASUREMENT

(71) Applicant: Rosemount Aerospace Inc., Burnsville, MN (US)

(72) Inventors: Richard William Phillips, Eagan, MN (US); Chansay Em, Eden Prairie, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 179 days.

(21) Appl. No.: 15/722,772

(22) Filed: Oct. 2, 2017

(65) Prior Publication Data

US 2019/0101456 A1 Apr. 4, 2019

(51) Int. Cl.
*G01K 7/14* (2006.01)
*G01K 7/02* (2006.01)
(Continued)

(52) U.S. Cl.
CPC ............. *G01K 7/14* (2013.01); *G01K 3/00* (2013.01); *G01K 7/021* (2013.01); *G01K 7/16* (2013.01); *G01K 7/42* (2013.01)

(58) Field of Classification Search
CPC .................................................. G01K 7/12–13
See application file for complete search history.

(56) References Cited

U.S. PATENT DOCUMENTS 3,939,711 A * 2/1976 Hanaoka ................. F02P 17/00
374/113
8,596,113 B2 * 12/2013 Matsumoto ............... G01F 1/00
73/114.31

(Continued)

FOREIGN PATENT DOCUMENTS

EP 1498713 A1 * 1/2005 ............. G01K 7/021
GB 1311405 A 3/1973
SU 463010 A1 * 3/1975 ............... G01K 7/02

OTHER PUBLICATIONS

"Thermocouple Thermometry." 2001. Traceable Temperatures, January, 295-342. (Year: 2001).*

(Continued)

*Primary Examiner* — Clayton E. LaBalle
*Assistant Examiner* — Leon W Rhodes, Jr.
(74) *Attorney, Agent, or Firm* — Kinney & Lange P.A.

(57) ABSTRACT

Apparatus and associated methods relate to generating a temperature measurement signal based upon a weighted average of signals generated by a resistive temperature detector (RTD) and a thermocouple device. The thermocouple device includes first and second thermocouple junctions. The first thermocouple junction is thermally coupled to the RTD, and the second thermocouple junction is thermally isolated from the RTD. The thermocouple is configured to generate a signal indicative of a difference between first and second thermocouple junctions, which is substantially equal to the difference between the RTD and the second thermocouple junction due to the thermal coupling configuration. The RTD generates a signal indicative of a temperature of the RTD. A weighted sum of the first and second signals is indicative of a temperature of the second thermocouple junction, which responds rapidly to temperature fluctuations, due to its having a relatively small thermal mass compared with the RTD.

20 Claims, 7 Drawing Sheets

(51) Int. Cl.
 *G01K 7/42* (2006.01)
 *G01K 3/00* (2006.01)
 *G01K 7/16* (2006.01)

(56) References Cited

U.S. PATENT DOCUMENTS 9,435,832 B2 9/2016 Hetzler
2017/0038263 A1\* 2/2017 Fury ..................... G01K 7/16

OTHER PUBLICATIONS

Extended European Search Report dated Feb. 2, 2019, received for corresponding European Application No. 18198011.1.

\* cited by examiner

ACCURATE AND FAST RESPONSE TEMPERATURE MEASUREMENT

BACKGROUND

Resistive Temperature Detectors (RTDs) are sensors that provide an electrical resistance that is indicative of a temperature. RTDs have relatively-high signal-sensitivity compared with other types of temperature sensors. The electrical signal generated by RTDs are repeatable, in that if an RTD is repeatedly exposed to the same temperature, then the RTD will repeatedly generate substantially the same electrical signal in response. RTDs are made using materials that have a resistivity that is a function of temperature. For example, some Metallic RTDs, such as platinum, exhibit a positive temperature coefficient of resistance.

Although RTDs are repeatable and have relatively-high signal-sensitivity, RTDs can produce signals that are inaccurate. For example, RTDs have a non-zero thermal mass. Because the thermal mass of RTDs is non-zero, the temperature of the RTD will lag dynamic external temperatures exposed thereto. Therefore, the more rapidly the dynamic external temperature varies, the greater will be the inaccuracy of the RTD. Other inaccuracies can result from self-heating within an RTD. For example, an RTD is typically biased by a current or by a voltage. If biased by a current, then the voltage across the RTD can be used as the electrical signal indicative of the temperature. If, however, biased by a voltage, then the current through the RTD can be used as the signal indicative of the temperature. In either scenario, the RTD will dissipate power, and some self-heating of the RTD will result.

Steady-state errors can also arise because of heat transfer dynamics of a temperature sensing system. For example, competing paths of thermal conductivity in a body of the temperature sensing system can prevent the sensing element of the system from reaching thermal equilibrium with the medium to be measured.

Thermocouples can be used instead of RTDs as an alternative temperature sensor. Thermocouples can be made to have much smaller thermal mass than many RTDs. Because thermocouples have very small thermal masses, thermocouples do not lag dynamic temperature variations by very much. Thermocouples also dissipate very little power. Thermocouples are typically not biased with a current or a voltage. Thermocouples are typically made of two electrically conductive wire leads of dissimilar materials. The wire leads can be connected to one another at a thermocouple junction. A temperature difference between the thermocouple junction and the unconnected ends of the wire leads results in a voltage across the unconnected ends of the wire leads. A high impedance voltage sensor can detect the resulting voltage while causing very little current to flow through the thermocouple. The thermocouple output signal is related to the temperature difference between the two junctions.

Although thermocouples have low self-heating and fast response times, thermocouples typically are less accurate and are less repeatable than RTDs. Thus, different applications might require, or at least prefer, different temperature sensors.

SUMMARY

Apparatus and associated methods relate to a temperature measurement arrangement having a resistive temperature detector (RTD), at least one thermocouple, and a processor. The temperature measurement arrangement is configured to determine temperature faster than the RTD alone and more accurately than the at least one thermocouple alone.

Some embodiments relate to a temperature measurement system that includes first and second sensing modules and an electronic temperature processor. The first sensing module includes a resistive temperature detector (RTD) configured to generate a first sensing signal indicative of a first temperature of the first sensing module. The first sensing module also includes a first thermocouple junction formed of a first type of conductive material and a second type of conductive material dissimilar to the first type of conductive material. The second sensing module includes a second thermocouple junction formed of the first type of conductive material and the second type of conductive material. The first and second thermocouple junctions form a thermocouple sensor configured to generate a second sensing signal indicative of a temperature difference between the first temperature of the first sensing module and a second temperature of the second sensing module. The electronic temperature processor is configured to generate, based on a weighted sum of the first sensing signal generated by the RTD and the second sensing signal generated by the thermocouple sensor. The weighted sum is indicative of an external temperature to which both the first sensing module and the second sensing module are exposed.

Some embodiments relate to a method for generating a signal indicative of a dynamic external temperature. The method includes generating, via a resistive temperature detector (RTD), a first sensing signal indicative of a first temperature of the RTD. A first thermocouple junction is thermally coupled to the RTD. A second thermocouple junction is thermally isolating from the RTD. The RTD and the first and second thermocouple junctions are exposed to the dynamic external temperature. A second sensing signal indicative of a temperature difference between the first temperature of the RTD and a second temperature of the second thermocouple junction is generated, via a thermocouple sensor formed by the first and second thermocouple junctions generates. Then, a weighted sum of the first sensing signal generated by the RTD and the second sensing signal generated by the thermocouple sensor is generated, via an electronic temperature processor. The weighted sum is indicative of the dynamic external temperature to which the RTD and the first and second thermocouple junctions are exposed.

Some embodiments relate to a temperature measurement system that includes an electronic temperature processor. The temperature measurement system includes a first sensing module having a first thermal mass. The first sensing module includes a resistive temperature detector (RTD) configured to generate a first sensing signal indicative of a first temperature of the first sensing module. The first sensing module also includes a first wire lead of a first conductive material extending between and conductively coupling the electronic temperature processor and the first sensing module. The temperature measurement system includes a second sensing module having a second thermal mass less than the first thermal mass. The second sensing module includes a second wire lead of the first conductive material extending between and conductively coupling the electronic temperature processor and the second sensing module. The temperature measurement system also includes a third wire lead of a second conductive material dissimilar to the first conductive material. The third wire lead extends between and conductively couples the first sensing module and the second sensing module.

DETAILED DESCRIPTION

Apparatus and associated methods relate to generating a temperature measurement signal based upon a weighted average of signals generated by a resistive temperature detector (RTD) and a thermocouple device. The thermocouple device includes first and second thermocouple junctions. The first thermocouple junction is thermally coupled to the RTD, and the second thermocouple junction is thermally isolated from the RTD. The thermocouple is configured to generate a signal indicative of a temperature difference between the first and second thermocouple junctions, which is substantially equal to the temperature difference between the RTD and the second thermocouple junction due to the thermal coupling configuration. The RTD generates a signal indicative of a temperature of the RTD. A weighted sum of the first and second signals is indicative of a temperature of the second thermocouple junction, which responds rapidly to temperature fluctuations, due to its having a relatively small thermal mass compared with the RTD.

Figure 1:
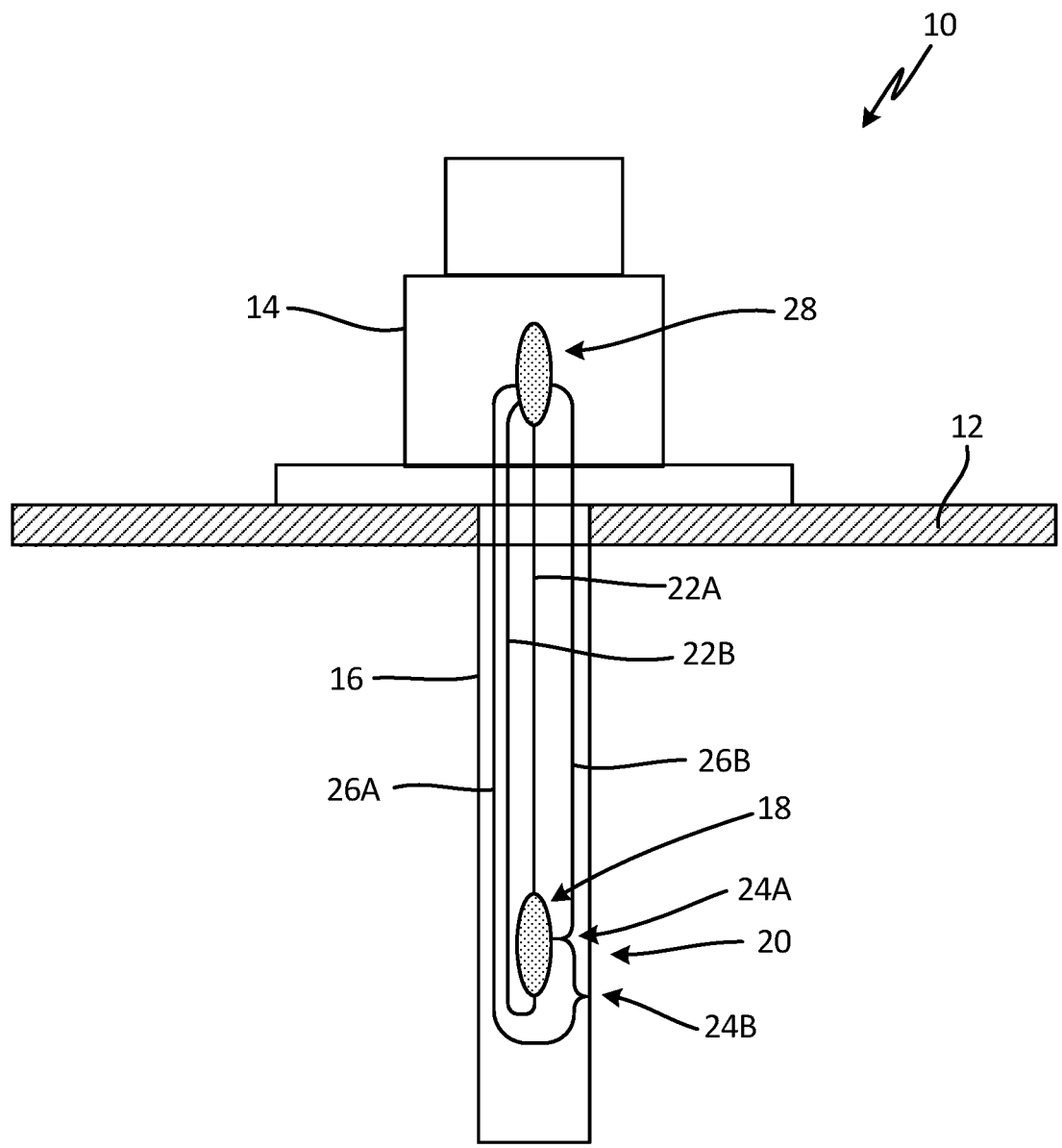
FIG. 1 is a side elevation view of an exemplary temperature measurement system that is both accurate, and fast-responding.

FIG. 1 is a side elevation view of an exemplary temperature measurement system that is both accurate, and fast-responding. In FIG. 1, temperature measurement system 10 is shown connected to vessel wall 12. Temperature measurement system 10 includes a head portion 14 located on one side of vessel wall 12, and a projecting sensing portion 16 on the other side of vessel wall 12. Projecting sensing portion 16 includes two sensors—RTD 18 and thermocouple sensor 20. RTD 18 generates a first sensing signal on wire leads 22A and 22B that is indicative of a temperature of RTD 18.

Thermocouple sensor 20 includes first thermocouple junction 24A and second thermocouple junction 24B. First thermocouple junction 24A is in thermal contact with RTD 18. Second thermocouple junction 24B is thermally isolated from RTD 18. Because of this thermal coupling configuration, thermocouple sensor 20 is configured to generate a second sensing signal across wire leads 26A and 26B that is indicative of a difference between the temperature of first thermocouple junction 24A and the temperature of second thermocouple junction 24B.

Head portion 14 includes electronic temperature processor 28. Electronic temperature processor 28 is conductively connected to both RTD 18 and thermocouple 20 via wire leads 22A, 22B, 26A and 26B. Electronic temperature processor 28 receives both the first sensing signal generated by RTD 18 and the second sensing signal generated by thermocouple sensor 20. Electronic temperature processor 28 generates a weighted sum of the first and second sensing signals. The weighted sum is an accurate and fast-responding signal indicative of the temperature of an external ambient to which both RTD 18 and thermocouple sensor 20 are exposed. Head portion 14 can generate an output signal to communicate the generated weighted sum to an external system, such as, for example, a control system. In some embodiments, head portion 14 includes an electrical interface to conductively couple to electrical power and output lines. In other embodiments, head portion 14 can be configured to wirelessly transmit the generated output signal to the external system.

Figure 2:
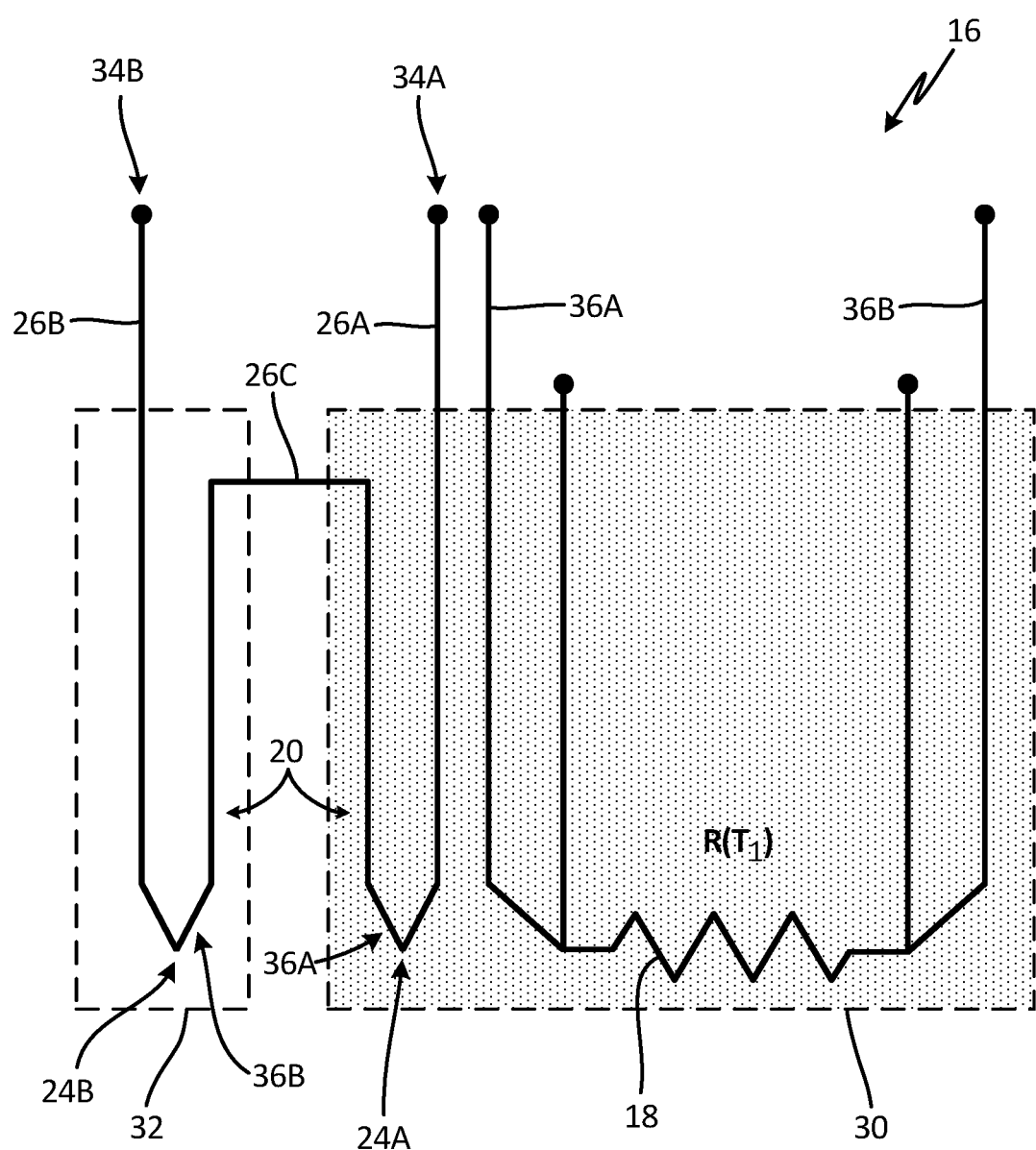
FIG. 2 is a schematic diagram of an embodiment of an accurate and fast-responding temperature measurement system.

FIG. 2 is a schematic diagram of an embodiment of an accurate and fast-responding temperature measurement system. In FIG. 2, projecting sensing portion 16 of electronic temperature system 10 depicted in FIG. 1 is shown in schematic form. Projecting sensing portion 16 includes first sensing module 30 and second sensing module 32. First sensing module 30 and second sensing module 32 are thermally isolated from one another. Thermal isolation of first and second sensing modules 30 and 32 can permit first and second sensing modules 30 and 32 to be at different temperatures. Such different temperatures can arise for various reasons. For example, first and second sensing modules 30 and 32 can have different levels of power consumption, which can cause different amounts of self-heating. First and second sensing modules 30 and 32 can have different thermal masses, which can lead to different rates of response to a dynamic temperature of the external ambient environment. First and second sensing modules 30 and 32 can have different amounts of heat transfer conducted through the supporting structure, which can result in different sensed temperatures at steady-state conditions.

First sensing module 30 includes RTD 18 and first thermocouple junction 24A. RTD 18 is shown schematically as a temperature-dependent resistor $R(T_1)$. Wire lead 26A (e.g., of a first material) extends from connection end 34A to first sensing module 30 where it conductively couples to first end 36A of wire lead 26C (e.g., of a second material), thereby forming first thermocouple junction 24A. Wire lead 26B extends from connection end 34B to second sensing module 32, where it conductively couples to second end 36B of wire lead 26C, thereby forming second thermocouple junction 24B. Therefore, wire lead 26C extends from first sensing module 30 to second sensing module 32. Wire leads 26A and 26C form first thermocouple junction 24A via direct physical connection one to another. Wire leads 26B and 26C form second thermocouple junction 24B via direct physical connection one to another. First thermocouple junction 24A is in thermal conduction with RTD 18, such that RTD 18 and first thermocouple junction 24A are exposed to (e.g., experience or are maintained at) substantially the same temperature. In some embodiments, RTD 18, wire leads 26A and 26B can be made of nominally the same material composition.

RTD 18 is configured to generate a first sensing signal indicative of a first temperature of first sensing module 30. RTD 18 is configured to provide the generated first sensing signal on wire leads 36A and 36B. First sensing module 30 and second sensing module 32 are substantially thermally isolated from one another. Such thermal isolation can permit first and second sensing modules 30 and 32 to independently respond to temperature changes, for example. Such thermal isolation can permit first and second sensing modules 30 and 32 to have different steady-state temperatures due to differences in self-heating, differences in thermal response times, or differences in heat transfer conducted through supporting structures, for example. At each moment of time, first and second sensing modules 30 and 32 can be at different temperatures, one from another. First and second thermocouple junctions 24A and 24B are configured to form thermocouple sensor 20. Thermocouple sensor 20 is configured to generate a second sensing signal indicative of any temperature difference between the first temperature of first sensing module 30 and a second temperature of second sensing module 32. Thus, when the first and second sensing signals are normalized and then added together, the resulting sum can be a signal indicative of the second temperature of second sensing module 24B. At equilibrium (e.g., when no temperature difference between the first and second temperatures exists), the normalized second sensing signal will be approximately zero, and the normalized first sensing signal can be indicative of the temperatures of both first and second sensing modules 30 and 32.

Figure 3A:
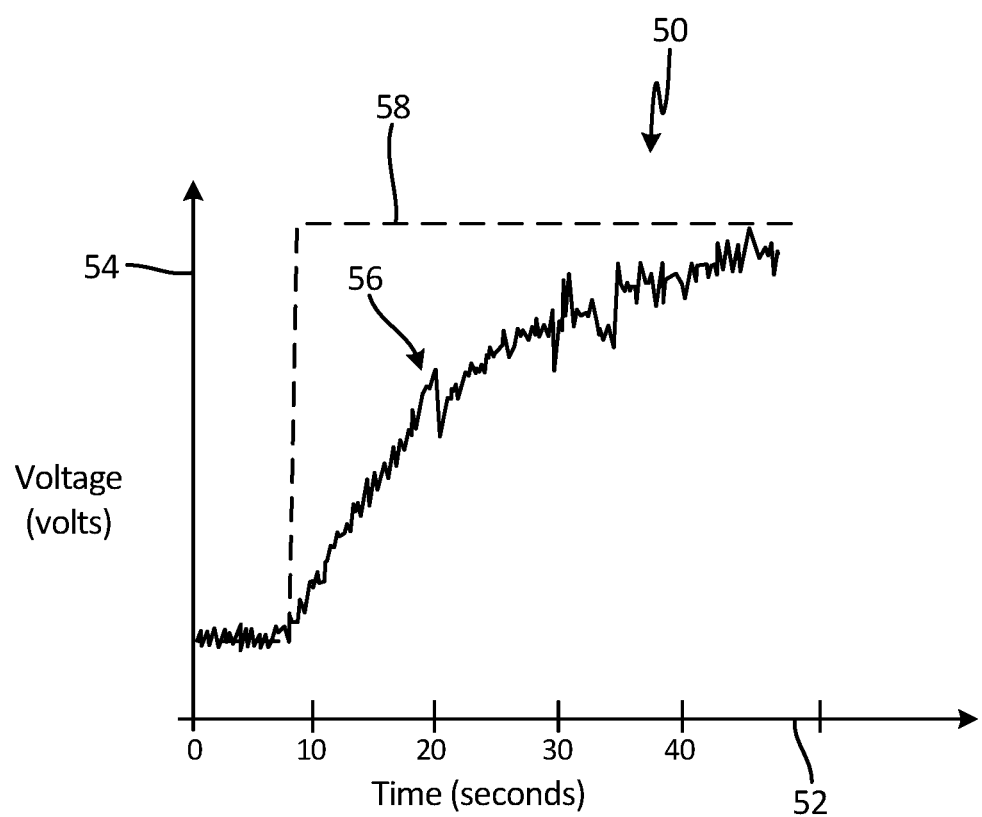
FIGS. 3A-3C are graphs of signal responses of an RTD alone, a thermocouple sensor alone, and both the RTD and the thermocouple sensor in combination, respectively, of the temperature measurement system depicted in FIG. 2.
Figure 3B:
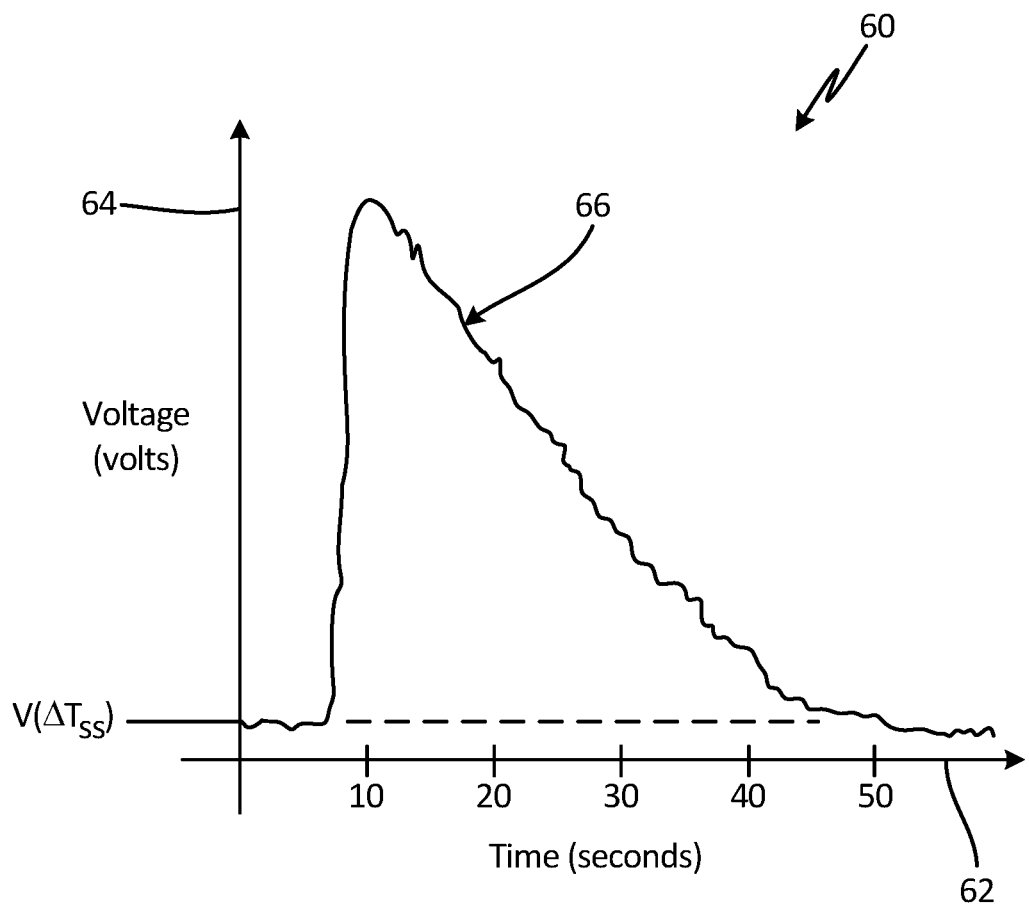
Figure 3C:
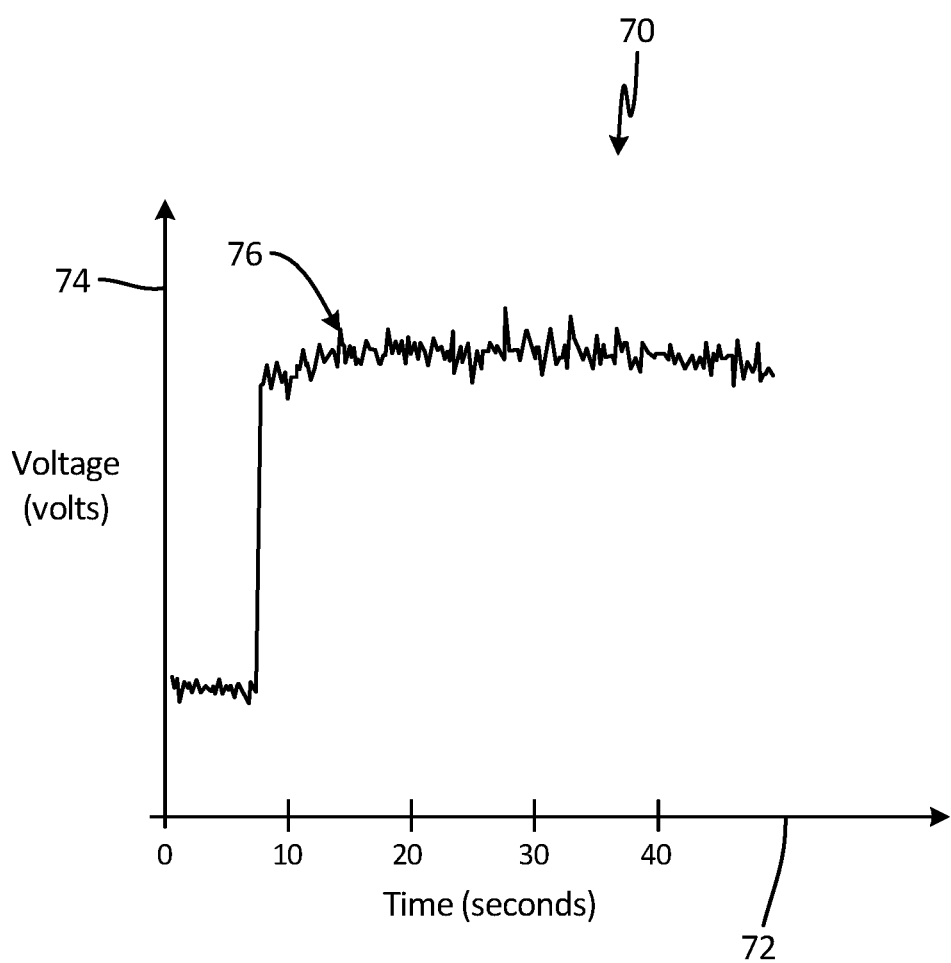

FIGS. 3A-3C are graphs of signal responses of RTD 18 alone, thermocouple sensor 20 alone, and both RTD 18 and thermocouple sensor 20 in combination, respectively, of the temperature measurement system depicted in FIG. 2. In FIG. 3A, graph 50 includes horizontal axis 52, vertical axis 54, RTD-output-signal/time relation 56, and dynamic temperature relation 58 of an ambient environment. Horizontal axis 52 is indicative of time. Vertical axis 54 is indicative of RTD output signal value (e.g., volts or amps, etc.). An ambient environment to which the RTD is exposed has dynamic temperature relation 58 depicted in graph 50. RTD-output-signal/time relation 56 depicts the value of the signal generated by RTD 18 (depicted in FIGS. 1 and 2) in response to dynamic external relation 58 of the ambient environment. In the FIG. 3A depiction, the external temperature (i.e., temperature of external ambient) to which RTD 18 is exposed is at a first temperature value from 0 seconds until 7 seconds, at which time the external temperature abruptly increases in a step-function manner to a second temperature value. RTD 18 responds to such a dynamic external temperature in a lagging fashion, as indicated by RTD-output-signal/time relation 56. Such a lagging response to a step function temperature profile can result from a non-zero thermal mass of RTD 18 and/or of supporting structures. A non-zero thermal mass cannot respond instantaneously to such a step-function type of temperature profile.

In FIG. 3B, graph 60 includes horizontal axis 62, vertical axis 64, and thermocouple-output-signal/time relation 66. Horizontal axis 62 is indicative of time. Vertical axis 64 is indicative of thermocouple output signal value. Thermocouple-output-signal/time relation 66 depicts the value of the signal generated by thermocouple sensor 20 (depicted in FIGS. 1 and 2) in response to a dynamic external temperature. In the FIG. 3B depiction, the external temperature to which thermocouple sensor 20 is exposed is the same step-function type of temperature profile as described above with reference to FIG. 3A. First and second sensing modules 30 and 32 (depicted in FIGS. 1 and 2) can respond to such a dynamic external temperature in dissimilar fashions, due to dissimilar thermal masses, for example. Thermocouple sensor 20 responds to such a dynamic temperature difference between first and second sensing modules 30 and 32, as indicated by thermocouple-sensor signal/time relation 66. Such a signal response to a step function temperature profile can result from a difference in the response rates of sensing modules 30 and 32 caused by difference in thermal masses of sensing modules 30 and 32. Thermocouple-output-signal/time relation 66 indicates a non-zero signal level between 0 seconds and 7 seconds. Such a non-zero signal level can be indicative of a steady-state temperature difference ($\Delta T_{SS}$) between the first temperature of first sensing module 30 and the second temperature of second sensing module 32. Such a steady-state temperature difference can arise from differences in the self-heating of first and second sensing modules 30 and 32, for example. Thermocouple-signal/time relation 66 asymptotically again approaches the steady-state non-zero signal level after a transient portion of thermocouple-sensor signal/time relation 66.

In FIG. 3C, graph 70 includes horizontal axis 72, vertical axis 74, and combined-signal/time relation 76. Horizontal axis 72 is indicative of time. Vertical axis 74 is indicative of RTD output signal value. Combined-signal/time relation 76 depicts the value of the signal generated by temperature measurement system 10 (depicted in FIG. 1) in response to a dynamic external temperature. In the FIG. 3C depiction, the external temperature to which temperature measurement system 10 is exposed is again the same step-function type of temperature profile as described above with reference to FIG. 3A. Temperature measurement system 10 normalizes and combines signals generated by RTD 18 and thermocouple 20. Such a combined response to a step-function temperature profile can provide a response signal that has the precision of RTD 18 and the rapid response of thermocouple 20 as indicated in measurement system combined-signal/time relation 76.

Figure 4:
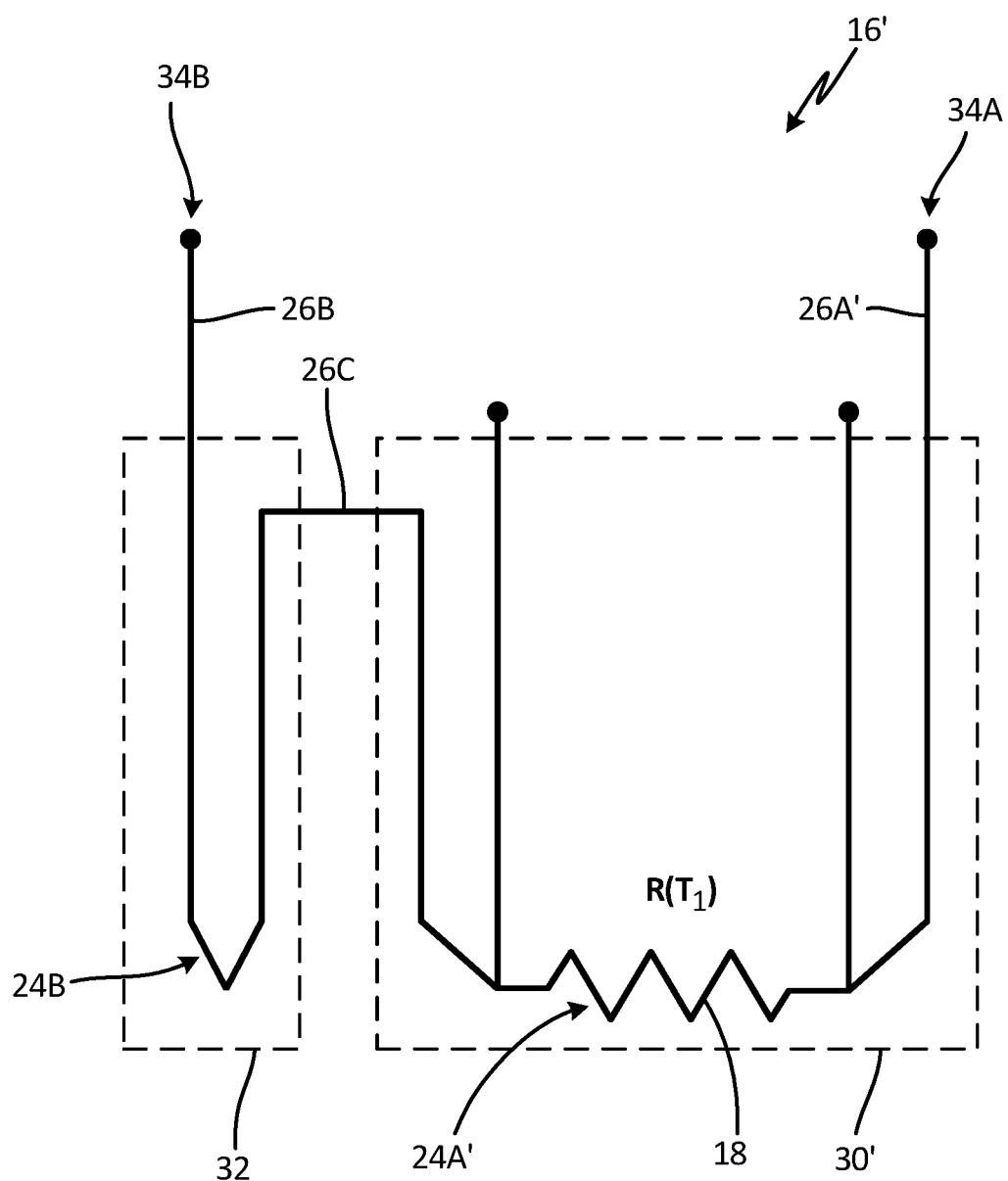
FIG. 4 is a schematic diagram of another embodiment of an accurate and fast-responding temperature measurement system.

FIG. 4 is a schematic diagram of an alternate embodiment of an accurate and fast-responding temperature measurement system. In FIG. 4, projecting sensing portion 16' is shown in schematic form. The FIG. 4 embodiment is like the FIG. 2 embodiment, except first sensing module 30'. First sensing module 30' is configured with RTD 18 between wire leads 26A and 26C. This configuration permits a two-wire interface between projecting sensing portion 16' and electronic temperature processor 28 (depicted in FIG. 1). Normalization of sensing signals is performed by selection of materials used as leads 26A, 26B and 26C of thermocouple 20 and biasing of RTD 18, so as to provide substantially equal signal sensitivities to temperature. Summation of first and second sensing signals can then be performed by wiring RTD 18 and thermocouple 20 in series.

First sensing module 30' includes RTD 18 and first thermocouple junction 24A'. RTD 18 is shown schematically as a temperature-dependent resistor $R(T_1)$. First thermocouple junction 24A' can be formed between wire leads 26A' (e.g., of a first material) and 26C (e.g., of a second material). Wire lead 26A' extends from connection end 34A to first sensing module 30' where it conductively couples to a first terminal of RTD 18. Wire lead 26B extends from connection end 34B to second sensing module 32 where it conductively couples to wire lead 26C, thereby forming second thermocouple junction 24B. Wire lead 26C extends from second sensing module 32 to first sensing module 30, where it conductively couples to a second terminal of RTD 18. Wire leads 26A and 26C form first thermocouple junction 24A' via RTD 18. First thermocouple junction 24A' is in thermal conduction with RTD 18, such that RTD 18 and first thermocouple junction 24A' are exposed to (e.g., experience or are maintained at) substantially the same temperature. In some embodiments, RTD 18, wire leads 26A' and 26B can be made of nominally the same material composition. The FIG. 4 depicted embodiment can facilitate relatively simple circuitry to be used in electronic temperature processor 20, for example. The FIG. 4 depicted embodiment can be tested by a four-wire ohm meter. The four-wire ohm-meter can provide a current to the series connected temperature measurement system and then detect the voltage via Kelvin contacts coupled to the series connected temperature measurement system.

Figure 5:
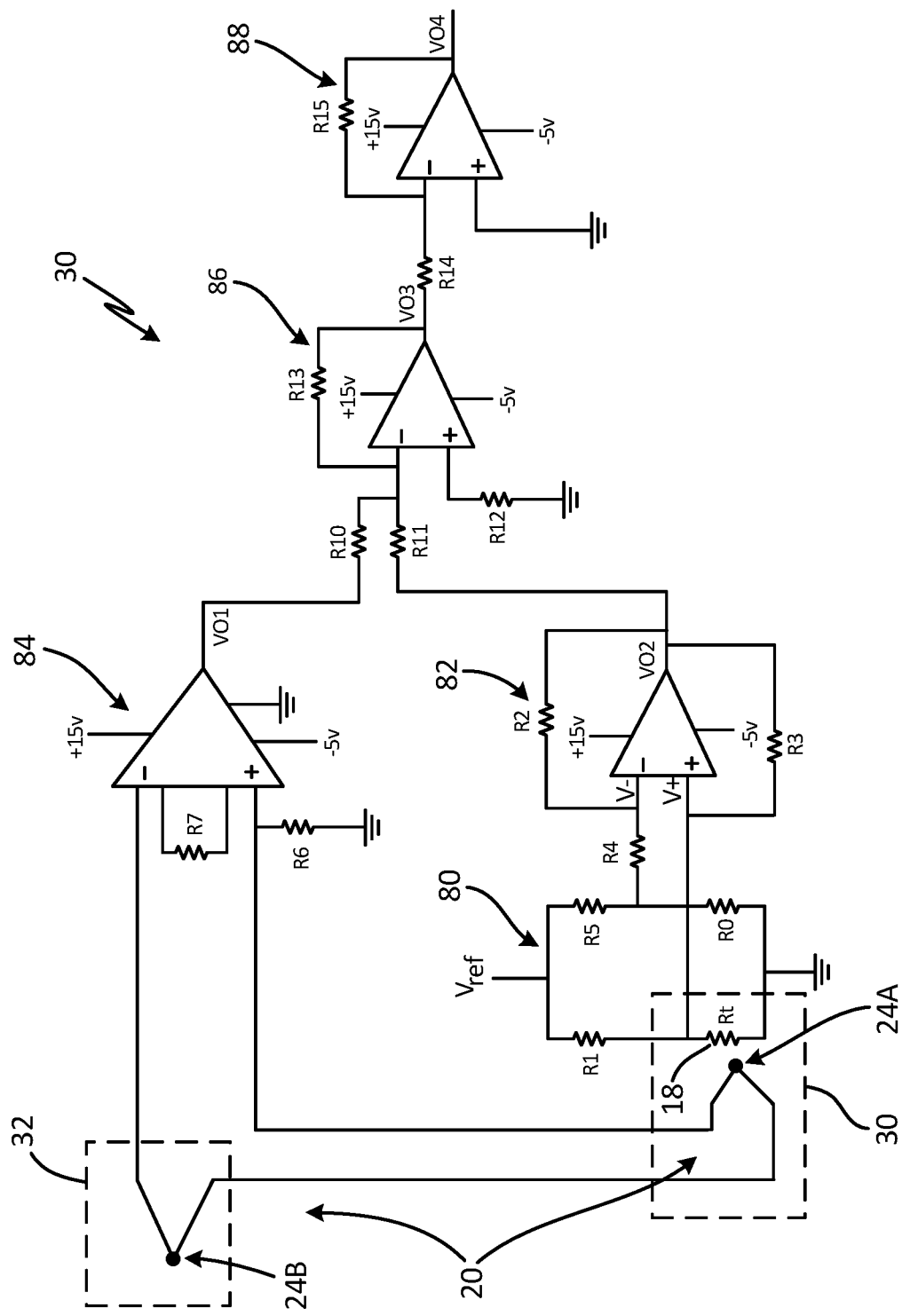
FIG. 5 is a schematic diagram of an alternate embodiment of an electronic temperature processor that can be used in combination with the temperature measurement system depicted in FIG. 4.

FIG. 5 is a schematic diagram of an embodiment of an electronic temperature processor that can be used in combination with the temperature measurement system depicted in FIG. 2. In FIG. 5, electronic temperature processor 28 is depicted interfacing with first sensor module 30 and second sensor module 32. Electronic temperature processor 28 includes Wheatstone bridge 80, RTD signal conditioner 82, thermocouple signal conditioner 84, summing amplifier 86, and inverting amplifier 88. Wheatstone bridge 80 employs RTD 18 in one of four leg positions. A differential output signal is sent from Wheatstone bride 80 to RTD signal conditioner 82. RTD output signal conditioner 82 and thermocouple signal conditioner 84 can be used to normalize the output signals generated by RTD 18 and thermocouple sensor 20. The normalized output signals of RTD 18 and thermocouple sensor 20 can be made so that they have substantially the same sensitivity to temperature. Such normalization can permit the normalized output signals to be added so that the resulting sum is indicative of a temperature of sensing module In some embodiments, weighting coefficients and/or filtering coefficients can be changed in response to a magnitude of the second sensing signal generated by thermocouple sensor 20. Such changes in weighting coefficients and or filtering behavior can provide a precision mode of operation and a fast-response mode of operation, for example. Such changes in weighting coefficients and/or filtering behavior can reduce the noise associated with the second sensing signal generated by thermocouple sensor 20, for example. In an exemplary embodiment, the second sensing signal can be passed through a low-pass filter when the magnitude of the second sensing signal is less than a predetermined threshold. In some embodiments, the weight of the second sensing signal can be reduced, perhaps in some embodiments to zero, in response to the magnitude of the second sensing signal being less than a predetermined threshold. In such embodiments, when operating in a steady-state temperature environment, the normalized summed output signal can have a noise characteristic of RTD 18 alone.

In some embodiments, a first thermal mass of first sensing module 30 or 30' is dissimilar to a second thermal mass of second sensing module 32. For example, in some embodiments, a ratio of the first thermal mass to the second thermal mass can be greater than 3, 10, or 30. In some embodiments, a first thermal resistance characterizing a thermal coupling between first thermocouple junction 24A or 24A' and RTD 18 is dissimilar to a second thermal resistance characterizing a thermal coupling between second thermocouple junction 22 and RTD 18. For example, in some embodiments, a ratio between the second thermal resistance to the first thermal resistance can be greater than 3, 10, or 30.

Discussion of Possible Embodiments

The following are non-exclusive descriptions of possible embodiments of the present invention.

Apparatus and associated methods relate to temperature measurement system that includes a first sensing module including, a second sensing module, and an electronic temperature processor. The first sensing module includes a resistive temperature detector (RTD) configured to generate a first sensing signal indicative of a first temperature of the first sensing module. The first sensing module includes a first thermocouple junction formed of a first type of conductive material and a second type of conductive material dissimilar to the first type of conductive material. The second sensing module includes a second thermocouple junction formed of the first type of conductive material and the second type of conductive material. The first and second thermocouple junctions form a thermocouple sensor configured to generate a second sensing signal indicative of a temperature difference between the first temperature of the first sensing module and a second temperature of the second sensing module. The electronic temperature processor is configured to generate, based on a weighted sum of the first sensing signal generated by the RTD and the second sensing signal generated by the thermocouple sensor, a weighted sum signal indicative of an external temperature to which both the first sensing module and the second sensing module are exposed.

The system of the preceding paragraph can optionally include, additionally and/or alternatively, any one or more of the following features, configurations and/or additional components:

A further embodiment of the foregoing system, wherein the second sensing module can be mechanically connected, via a thermal insulator, to the first sensing module, so as to provide thermal isolation between the first and second sensing modules.

A further embodiment of any of the foregoing systems, wherein the first thermocouple junction and the RTD can be thermally coupled, via a thermal conductor, to the first sensing module, so that temperatures of the first thermocouple junction and the RTD are substantially equal to the first temperature of the first sensing module.

A further embodiment of any of the foregoing systems, wherein the first sensing module can have a first thermal mass and the second sensing module has a second thermal mass, a ratio of the first thermal mass to the second thermal mass being greater than 10.

A further embodiment of any of the foregoing systems, wherein a first thermal resistance characterizes a thermal coupling between the first thermocouple junction and the RTD, and a second thermal resistance characterizes a thermal coupling between the second thermocouple junction and the RTD. A ratio of the second thermal resistance to the first thermal resistance can be greater than 10.

A further embodiment of any of the foregoing systems can further include a first wire lead of the first type of conductive material extending between and conductively connecting the first sensing module and the electronic temperature processor. Any of the foregoing systems can further include a second wire lead of the first type of conductive material extending between and conductively connecting the second sensing module and the electronic temperature processor. Any of the foregoing systems can further include a third wire lead of the second type of conductive material extending between and conductively connecting the first and second sensing modules.

A further embodiment of any of the foregoing systems, wherein the first wire lead can be conductively and thermally coupled to a first end of the RTD and the third wire lead is conductively and thermally coupled to a second end of the RTD, thereby forming, via the RTD, the first thermocouple junction between the first and third wire leads.

A further embodiment of any of the foregoing systems, wherein the second wire lead can be conductively and thermally coupled to the third wire lead, thereby forming the second thermocouple junction between the second and third wire leads.

A further embodiment of any of the foregoing systems, wherein the electronic temperature processor can include a first amplifier configured to receive the first sensing signal, and further configured to generate, based on the received first sensing signal, a first weighted sensing signal. The electronic temperature processor can further include a second amplifier configured to receive the second sensing signal, and further configured to generate, based on the received second sensing signal, a second weighted sensing signal. The electronic processor can further include a summing amplifier configured to add the generated first and second weighted sensing signals. The added first and second weighted sensing signals can be indicative of the external temperature to which both the first sensing module and the second sensing module are exposed.

A further embodiment of any of the foregoing systems, wherein the first and second weighted sensing signals having substantially equal temperature sensitivities.

A further embodiment of any of the foregoing systems, wherein the electronic temperature processor can further include selection circuitry configured to select, based on a magnitude of the second sensing signal, between a precision mode and a fast-response mode. The relative weighting and/or filtering of the first and second sensing signals can change between the precision mode and the fast-response mode.

Some embodiments relate to a method of generating signals indicative of a dynamic external temperature. The method includes generating, via a resistive temperature detector (RTD), a first sensing signal indicative of a first temperature of the RTD. The method includes thermally coupling a first thermocouple junction to the RTD. The method includes thermally isolating a second thermocouple junction from the RTD. The method includes exposing the RTD and the first and second thermocouple junctions to the dynamic external temperature. The method includes generating, via a thermocouple sensor formed by the first and second thermocouple junctions, a second sensing signal indicative of a temperature difference between the first temperature of the RTD and a second temperature of the second thermocouple junction. The method also includes generating, via an electronic temperature processor, a weighted sum of the first sensing signal generated by the RTD and the second sensing signal generated by the thermocouple sensor, a weighted sum signal indicative of the dynamic external temperature to which the RTD and the first and second thermocouple junctions are exposed.

The method of the preceding paragraph can optionally include, additionally and/or alternatively, any one or more of the following features, configurations and/or additional components:

A further embodiment of the foregoing method can further include outputting, based on the weighted sum, the weighted sum signal indicative of the dynamic external temperature.

A further embodiment of any of the foregoing methods, wherein thermally isolating the second thermocouple junction from the RTD can include mechanically connecting, via a thermal insulator, the second thermocouple junction to the RTD.

A further embodiment of any of the foregoing methods, wherein thermally coupling the first thermocouple junction to the RTD can include thermally coupling, via a thermal conductor, the RTD and the first thermocouple junction to a first sensing module.

Some embodiments relate to a temperature measurement system that includes an electronic temperature processor, a first sensing module, and a second sensing module. The first sensing module has a first thermal mass and includes a resistive temperature detector (RTD) configured to generate a first sensing signal indicative of a first temperature of the first sensing module. The first sensing module also includes a first wire lead of a first conductive material extending between and conductively coupling the electronic temperature processor and the first sensing module. The second sensing module has a second thermal mass less than the first thermal mass. The second sensing module includes a second wire lead of the first conductive material extending between and conductively coupling the electronic temperature processor and the second sensing module. The temperature measurement system also includes a third wire lead of a second conductive material dissimilar to the first conductive material. The third wire lead extends between and conductively coupling the first sensing module and the second sensing module.

The system of the preceding paragraph can optionally include, additionally and/or alternatively, any one or more of the following features, configurations and/or additional components:

A further embodiment of the foregoing system, wherein the first and third wire leads can be conductively and thermally coupled so as to form a first thermocouple junction in the first sensing module, and the second and third wire leads can be conductively and thermally coupled so as to form a second thermocouple junction in the second sensing module. The first and second thermocouple junctions form a thermocouple sensor configured to generate a second sensing signal indicative of a temperature difference between the first temperature of the first sensing module and a second temperature of the second sensing module.

A further embodiment of any of the foregoing systems, wherein the electronic temperature processor can be configured to generate, based on a weighted sum of the first sensing signal generated by the RTD and the second sensing signal generated by the thermocouple sensor. The weighted sum is indicative of an external temperature to which both the first sensing module and the second sensing module are exposed.

A further embodiment of any of the foregoing systems, wherein the electronic temperature processor can include a first amplifier, a second amplifier and a summing amplifier. The first amplifier can be configured to receive, via the fourth and fifth wire leads, the first sensing signal, and further configured to generate, based on the received first sensing signal, a first weighted sensing signal. The second amplifier can be configured to receive, via the first and second wire leads, the second sensing signal, and further configured to generate, based on the received second sensing signal, a second weighted sensing signal. The summing amplifier can be configured to add the generated first and second weighted sensing signals. The added first and second weighted sensing signals are indicative of an external temperature to which both the first sensing module and the second sensing module are exposed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A temperature measurement arrangement having:
   a resistive temperature detector (RTD);
   a single thermocouple; and
   a processor,
   wherein
   the RTD is configured to generate a first sensing signal,
   the single thermocouple is configured to generate a second sensing signal indicative of a temperature difference,
   the processor is configured to select between a precision mode and a fast-response mode based on a magnitude of the second sensing signal, and wherein the temperature measurement arrangement is configured to determine temperature faster than the RTD alone and more accurately than the single thermocouple alone.

2. The temperature measurement arrangement of claim 1, further comprising:
   a first sensing module including:
      the RTD, which is configured to generate the first sensing signal such that the first sensing signal is indicative of a first temperature of the first sensing module; and
      a first thermocouple junction of the single thermocouple, the first thermocouple junction formed of a first type of conductive material and a second type of conductive material dissimilar to the first type of conductive material;
   a second sensing module including:
      a second thermocouple junction of the single thermocouple, the second thermocouple junction formed of the first type of conductive material and the second type of conductive material,
   wherein the single thermocouple is configured to generate the second sensing signal such that the second sensing signal is indicative of a temperature difference between the first temperature of the first sensing module and a second temperature of the second sensing module; and
   the processor is configured to generate, based on a weighted sum of the first sensing signal generated by the RTD and the second sensing signal generated by the single thermocouple, a weighted sum signal indicative of an external temperature to which both the first sensing module and the second sensing module are exposed.

3. The temperature measurement arrangement of claim 2, wherein the second sensing module is mechanically connected, via a thermal insulator, to the first sensing module, so as to provide thermal isolation between the first and second sensing modules.

4. The temperature measurement arrangement of claim 2, wherein the first thermocouple junction and the RTD are thermally coupled, via a thermal conductor, to the first sensing module, so that temperatures of the first thermocouple junction and the RTD are substantially equal to the first temperature of the first sensing module.

5. The temperature measurement arrangement of claim 2, wherein the first sensing module has a first thermal mass and the second sensing module has a second thermal mass, a ratio of the first thermal mass to the second thermal mass being greater than 10.

6. The temperature measurement arrangement of claim 2, wherein a first thermal resistance characterizes a thermal coupling between the first thermocouple junction and the RTD, and a second thermal resistance characterizes a thermal coupling between the second thermocouple junction and the RTD, a ratio of the second thermal resistance to the first thermal resistance being greater than 10.

7. The temperature measurement arrangement of claim 2, further comprising:
   a first wire lead of the first type of conductive material extending between and conductively connecting the first sensing module and the processor;
   a second wire lead of the first type of conductive material extending between and conductively connecting the second sensing module and the processor; and
   a third wire lead of the second type of conductive material extending between and conductively connecting the first and second sensing modules.

8. The temperature measurement arrangement of claim 7, wherein the first wire lead is conductively and thermally coupled to a first end of the RTD and the third wire lead is conductively and thermally coupled to a second end of the RTD, thereby forming, via the RTD, the first thermocouple junction between the first and third wire leads.

9. The temperature measurement arrangement of claim 7, wherein the second wire lead is conductively and thermally coupled to the third wire lead, thereby forming the second thermocouple junction between the second and third wire leads.

10. The temperature measurement arrangement of claim 2, wherein the processor includes:
    a first amplifier configured to receive the first sensing signal, and further configured to generate, based on the received first sensing signal, a first weighted sensing signal;
    a second amplifier configured to receive the second sensing signal, and further configured to generate, based on the received second sensing signal, a second weighted sensing signal; and
    a summing amplifier configured to add the generated first and second weighted sensing signals, whereby the added first and second weighted sensing signals is indicative of the external temperature to which both the first sensing module and the second sensing module are exposed.

11. The temperature measurement arrangement of claim 10, wherein the first and second weighted sensing signals having substantially equal temperature sensitivities.

12. The temperature measurement arrangement of claim 10, wherein the processor further includes:
    selection circuitry configured to select, based on a magnitude of the second sensing signal, between the precision mode and the fast-response mode,
    wherein, the relative weighting and/or filtering of the first and second sensing signals changes between the precision mode and the fast-response mode.

13. A method of generating signals indicative of a dynamic external temperature, the method comprising:
    generating, via a resistive temperature detector (RTD), a first sensing signal indicative of a first temperature of the RTD;
    thermally coupling a first thermocouple junction to the RTD;
    thermally isolating a second thermocouple junction from the RTD;
    exposing the RTD and the first and second thermocouple junctions to the dynamic external temperature;
    generating, via a single thermocouple sensor formed by the first and second thermocouple junctions, a second sensing signal indicative of a temperature difference between the first temperature of the RTD and a second temperature of the second thermocouple junction;

selecting, via a processor, between a precision mode and a fast-response mode based on a magnitude of the second sensing signal; and generating, via the processor, a weighted sum of the first sensing signal generated by the RTD and the second sensing signal generated by the thermocouple sensor, a weighted sum signal indicative of the dynamic external temperature to which the RTD and the first and second thermocouple junctions are exposed.

14. The method of claim 13, further comprising:
outputting, based on the weighted sum, the weighted sum signal indicative of the dynamic external temperature.

15. The method of claim 13, wherein thermally isolating the second thermocouple junction from the RTD comprises:
mechanically connecting, via a thermal insulator, the second thermocouple junction to the RTD.

16. The method of claim 13, wherein thermally coupling the first thermocouple junction to the RTD comprises:
thermally coupling, via a thermal conductor, the RTD and the first thermocouple junction to a first sensing module.

17. A temperature measurement system comprising:
an electronic temperature processor;
a first sensing module having a first thermal mass, the first sensing module including:
  a resistive temperature detector (RTD) configured to generate a first sensing signal indicative of a first temperature of the first sensing module; and
  a first wire lead of a first conductive material extending between and conductively coupling the electronic temperature processor and the first sensing module;
a second sensing module having a second thermal mass less than the first thermal mass, the second sensing module including:
  a second wire lead of the first conductive material extending between and conductively coupling the electronic temperature processor and the second sensing module; and
  a third wire lead of a second conductive material dissimilar to the first conductive material, the third wire lead extending between and conductively coupling the first sensing module and the second sensing module;
wherein the first wire lead, the second wire lead, and the third wire lead are configured to generate a second sensing signal indicative of a temperature difference, and
wherein the electronic temperature processor is configured to select between a precision mode and a fast-response mode based on a magnitude of the second sensing signal.

18. The temperature measurement system of claim 17, wherein the first and third wire leads are conductively and thermally coupled so as to form a first thermocouple junction in the first sensing module, and the second and third wire leads are conductively and thermally coupled so as to form a second thermocouple junction in the second sensing module, and wherein the first and second thermocouple junctions form a thermocouple sensor configured to generate the second sensing signal such that the second sensing signal is indicative of a temperature difference between the first temperature of the first sensing module and a second temperature of the second sensing module.

19. The temperature measurement system of claim 18, wherein the electronic temperature processor is configured to generate, based on a weighted sum of the first sensing signal generated by the RTD and the second sensing signal generated by the thermocouple sensor, the weighted sum indicative of an external temperature to which both the first sensing module and the second sensing module are exposed.

20. The temperature measurement system of claim 18 further comprising: fourth and fifth wire leads extending between and conductively coupling the electronic temperature processor to the first sensing module, the fourth wire lead conductively coupled to a first end of the RTD, and the fifth wire lead conductively coupled to a second end of the RTD.

* * * * *